(12) United States Patent
Falola et al.

(10) Patent No.: US 8,448,189 B2
(45) Date of Patent: May 21, 2013

(54) IDENTIFYING INTRUSIONS INTO A NETWORK DATA PROCESSING SYSTEM

(75) Inventors: Dolapo Martin Falola, Round Rock, TX (US); Vinit Jain, Austin, TX (US); Shannon Marie MacAlpine, Round Rock, TX (US); Shawn Patrick Mullen, Buda, TX (US); James Stanley Tesauro, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 339 days.

(21) Appl. No.: 12/819,502

(22) Filed: Jun. 21, 2010

(65) Prior Publication Data
US 2010/0257607 A1 Oct. 7, 2010

Related U.S. Application Data

(63) Continuation of application No. 10/165,079, filed on Jun. 6, 2002, now abandoned.

(51) Int. Cl.
G06F 9/44 (2006.01)
G06F 11/30 (2006.01)
G06F 11/00 (2006.01)
G06F 17/30 (2006.01)

(52) U.S. Cl.
USPC ............... 719/318; 713/194; 726/22; 726/26

(58) Field of Classification Search
USPC ................... 713/194; 719/318; 726/22, 26
See application file for complete search history.

(56) References Cited

U.S. PATENT DOCUMENTS

| | | | |
|---|---|---|---|
| 5,892,903 A | 4/1999 | Klaus | |
| 5,905,859 A | 5/1999 | Holloway et al. | |
| 5,991,881 A | 11/1999 | Conklin et al. | |
| 6,442,694 B1 | 8/2002 | Bergman et al. | |
| 6,654,882 B1 | 11/2003 | Froutan et al. | |
| 6,711,127 B1 | 3/2004 | Gorman et al. | |
| 6,715,083 B1 | 3/2004 | Tovander | |
| 6,721,890 B1 | 4/2004 | Shrikhande | |
| 6,725,377 B1 | 4/2004 | Kouznetsov | |
| 6,745,333 B1 | 6/2004 | Thomsen | |
| 6,772,332 B1* | 8/2004 | Boebert et al. | 713/153 |
| 6,792,546 B1 | 9/2004 | Shanklin et al. | |
| 6,981,158 B1 | 12/2005 | Sanchez et al. | |
| 7,093,290 B2* | 8/2006 | Han et al. | 726/22 |
| 2002/0078202 A1* | 6/2002 | Ando et al. | 709/225 |
| 2002/0161925 A1* | 10/2002 | Munger et al. | 709/241 |
| 2003/0167404 A1 | 9/2003 | Han et al. | |
| 2004/0103307 A1 | 5/2004 | Raphaeli et al. | |

* cited by examiner

Primary Examiner — Charles E Anya
(74) Attorney, Agent, or Firm — Yee & Associates, P.C.; Libby Z. Toub (57) ABSTRACT

A method, apparatus and computer instructions for handling intrusions. A tracer packet is sent back to an intruder causing the intrusion in response to receiving notification of an intrusion from a particular node in a network data processing system. Nodes in the network data processing system are notified of the tracer packet. Identification of the node is stored for use in tracing a route of the tracer packet through the data processing system in response to receiving a message from a node indicating receipt of the tracer packet.

19 Claims, 4 Drawing Sheets

IDENTIFYING INTRUSIONS INTO A NETWORK DATA PROCESSING SYSTEM

This application is a continuation of application Ser. No. 10/165,079, filed Jun. 6, 2002, status pending.

BACKGROUND OF THE INVENTION

1. Technical Field

The present invention relates generally to an improved data processing system, and in particular, to a method and apparatus for handling intrusions. Still more particularly, the present invention provides a method and apparatus for identifying the source of an intrusion into a network data processing system.

2. Description of Related Art

Network data processing systems are commonly used in all aspects of business and research. These networks are used for communicating data and ideas as well as providing a repository to store information. Further, in many cases the different nodes making up a network data processing system may be employed to process information. Individual nodes may have different tasks to perform. Additionally, it is becoming more common to have the different nodes work towards solving a common problem, such as a complex calculation. A set of nodes participating in a resource sharing scheme is also referred to as a "grid" or "grid network". For example, nodes in a grid network may share processing resources to perform a complex computation, such as deciphering keys.

The nodes in a grid network may be contained within a network data processing system, such as a local area network (LAN) or a wide area network (WAN). These nodes also may be located in different geographically diverse locations. For example, different computers connected to the Internet may provide processing resources to a grid network. By applying the use of thousands of individual computers, large problems can be solved quickly. Grids are used in many areas, such as cancer research, physics, and geosciences. One problem with grids is that they are inherently vulnerable to network hacking because of the larger number of nodes typically present in grids.

Currently, hackers attack victim computers through a maze of network hops to mask the true location and identity of the source of the attacks. Typically, a hacker or other unauthorized user will take over one node and then from that node take over another node. This series of takeovers occurs until reaching a targeted victim. Current computer forensic methods may take months to track down a hacker if identifying a source is even possible. Therefore, it would be advantageous to have an improved method, apparatus, and computer instructions for identifying and tracking intrusions into nodes in a network data processing system, such as a grid.

SUMMARY OF THE INVENTION

The present invention provides a method, apparatus, and computer instructions for handling intrusions. A tracer packet is sent back to an intruder causing the intrusion in response to receiving notification of an intrusion from a particular node in a network data processing system. Nodes in the network data processing system are notified of the tracer packet. Identification of the node is stored for use in tracing a route of the tracer packet through the data processing system in response to receiving a message from a node indicating receipt of the tracer packet.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
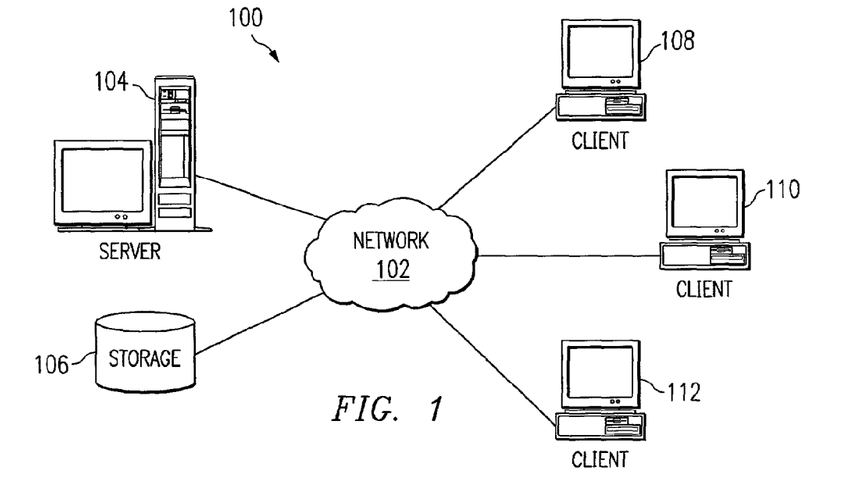
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables. In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention. The different servers and clients within network data processing system 100 are also referred to as nodes.

Figure 2:
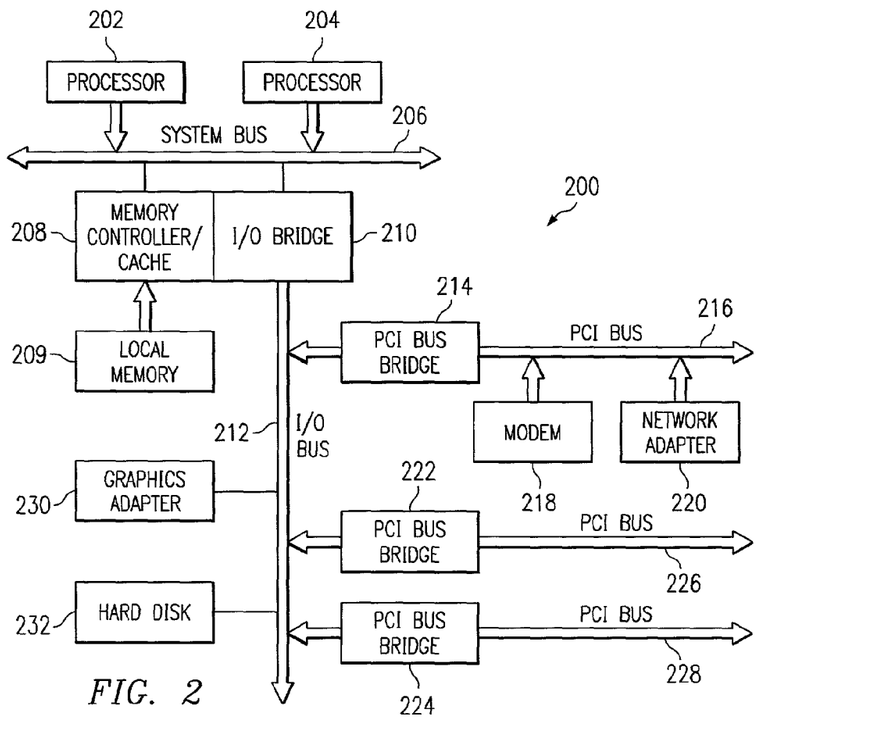
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

Figure 3:
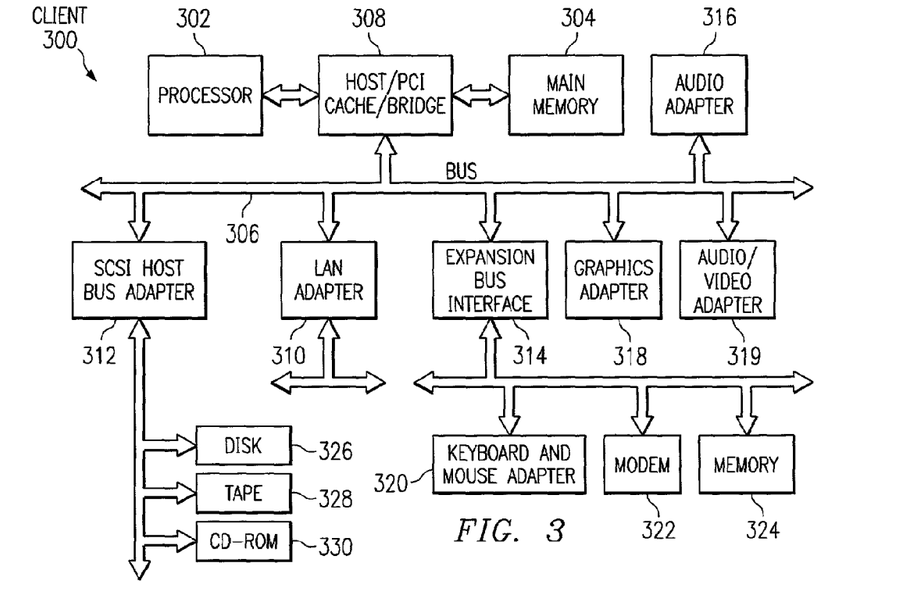
FIG. 3 is a block diagram illustrating a data processing system in which the present invention may be implemented.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. As a further example, data processing system 300 may be a personal digital assistant (PDA) device or a notebook computer.

The present invention recognizes that one characteristic of a grid is that different nodes within the grid may be geographically diverse. The nodes may be scattered throughout the Internet. The present invention takes advantage of this characteristic in providing a security tool. Routers are used to segregate Internet protocol (IP) packets and keep packets in line to their destination. Although this feature often prevents an unauthorized intruder from being easily tracked down, the present invention also recognizes that IP packets originating from a hacker can be uniquely identified by the IP checksum or very accurately identified by computing a digest on the packet of payloads. The present invention recognizes that these packets cannot be detected from a single point, but within a network data processing system, such as a LAN, a WAN, or the Internet, a central command point may be employed to tell different nodes within a network what IP packet characteristics should be reported. The reports of IP packets meeting these characteristics may be used by the central command point to identify a route back to the source of the intrusion.

Figure 4:
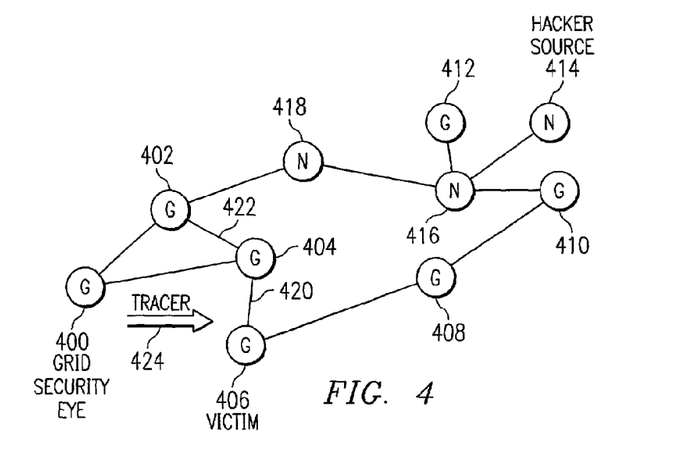
FIG. 4 is a diagram illustrating components used in tracking the source of an intrusion into a network data processing system in accordance with a preferred embodiment of the present invention.

With reference now to FIG. 4, a diagram illustrating components used in tracking the source of an intrusion into a network data processing system is depicted in accordance with a preferred embodiment of the present invention. In this example, nodes, 400, 402, 404, 406, 408, 410, and 412 are nodes in a grid. Nodes 414, 416, and 418 are nodes that are not part of the grid. In this example, these nodes are all nodes that are part of the Internet. Node 414 is the hacker source in this example, while node 406 is the victim. A hacker connects from node 414 and makes a connection to node 416. This connection may be, for example, via telnet. The hacker takes over node 416 and from this node attacks and takes over node 418. From node 418, the hacker attacks and takes over node 402 and uses this node to connect to and take over node 404. From node 404, the hacker reaches and attacks node 406, which is the victim.

In this example, the hacker at node 414 breaks into multiple machines making it difficult to trace the source of the attack. Node 406 detects an attack, but only sees packets originating from node 404. In this example, the mechanism of the present invention is able to trace a path back to node 414 through connections 420 and 422 to identify a point in which the hacker first entered the grid.

Basically, node 406, upon detecting the intrusion, does not break communication with the attacker. Node 406, however, does not send or receive data using the connection established by the hacker to avoid any further damage to this node. Node 406 notifies a "grid security eye", which is a central command point for use in identifying a source of intrusions. In this example, the grid security eye is embodied in node 400. The notification includes connection parameters for the connection made by the intruder, which is illustrated in FIG. 5.

Figure 5:
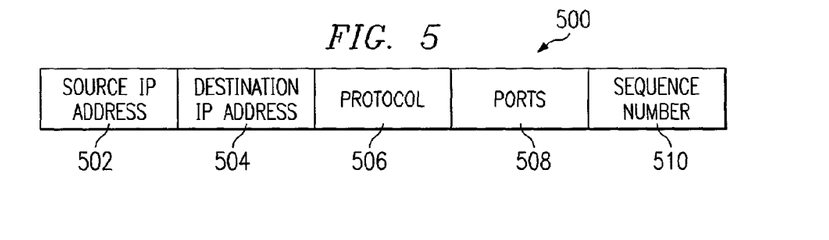
FIG. 5 is a diagram illustrating a set of connection parameters in accordance with a preferred embodiment of the present invention.

Turning now to FIG. 5, a diagram illustrating a set of connection parameters is depicted in accordance with a preferred embodiment of the present invention. In this example, connection parameters 500 contains connection information, such as source IP address 502, destination IP address 504, protocol 506, ports 508, and sequence number 510. Connection parameters 500 are illustrated as examples and the particular parameters may vary depending on the type of connection used in the intrusion.

Figure 6:
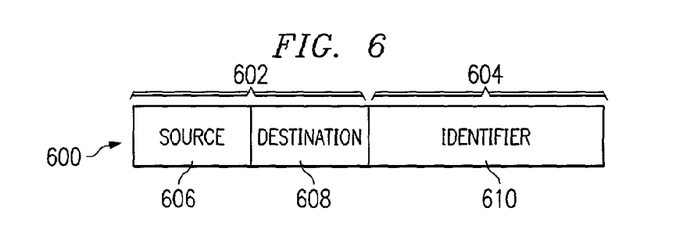
FIG. 6 is an example of a tracer packet illustrated in accordance with a preferred embodiment of the present invention.

With reference back to FIG. 4, when the grid security eye, represented by node 400, connection parameters, such as connection parameters 500 in FIG. 5, from node 406, tracer packet 424 is generated. This tracer packet is made to appear as if it 25 originated from the victim node, node 406. An example of a tracer packet is illustrated in FIG. 6, which is a diagram illustrating a tracer packet used to identify the source of an intrusion. Tracer packet 600 includes a header 602 and a payload 604. As formed by the grid 30 security eye, tracer packet 600 includes source 606 and destination 608. Source 606 is the IP address of the victim while destination 608 the IP address of the node next to the victim. In this example, the source is node 406 and the destination is node 404 in FIG. 4.

In this example, payload 604 includes identifier 610. In this example, the identifier may be used to generate a unique digital fingerprint. An algorithm, such as MD5 or SHA, may be used to generate a digital fingerprint from this identifier. Identifier 610 is tailored for the type of connection used by the hacker. For example, if the connection is through a telnet session, identifier 610 and payload 604 would include a series of spaces and backspaces. Such a payload may cause the cursor at node 414, in FIG. 4, to flutter but would not necessarily tip off the hacker that the intrusion has been identified and is being traced.

Turning back to FIG. 4, all of the nodes within the grid are notified or requested to monitor for tracer packet 424. In this example, the nodes are sent an identifier, such as identifier 610, in FIG. 6, for use in detecting whether tracer packet 424 has been received by a particular node. Thereafter, tracer packet 424 is sent to node 404 from node 400. As node 404 identifies tracer packet 424 based on the identifier located within tracer packet 424, notification is sent to node 400 that the packet has been received by node 404. Thereafter, node 404 sends tracer packet 424 to node 402, which identifies this packet as a tracer packet and sends tracer packet 424 on to node 418. In addition, node 402 sends a notification or report to node 400 that tracer packet 424 has been received by this node. Node 418 is not part of the grid and will send the packet on to node 416, which in turn sends the packet back to node 414, the source of the intrusion. Node 414 treats tracer packet 424 as a corrupted packet or as garbage and discards tracer packet 424.

Through these notifications, the entry point into the grid at node 402 is identified and any necessary actions to prevent intrusions at this point may be taken. In some cases, if the hacker is located at a grid node, then the source of the hacker may be pinpointed to a specific machine.

In some cases, a grid node is not along the path in the connection setup between the hacker source and the victim, but the node may detect a packet that is not intended for the node. In such an instance, the node still alerts the grid security eye of the vicinity of the tracer. In the depicted examples, the ability to track the tracer packet goes beyond having only nodes that are part of the hacker break-in path report detecting the tracer packet. Such a feature allows for a situation in which a hacker breaks into a grid node and disables the node's ability to report seeing a tracer packet. The mechanism of the present invention includes having all participating grid nodes look for the tracer packet. The grid security eye, node 400, sends a message to all participating grid nodes to be on the lookout for the tracer packet. Then, all nodes start monitoring all of the network traffic. This type of monitoring may be performed by monitoring the network in a promiscuous mode (iptrace in AIX, snoop in Solaris). Thus, in a preferred embodiment of the present invention, nodes 412 and 410 would report seeing the tracer packet going into the hacker node 414.

Figure 7:
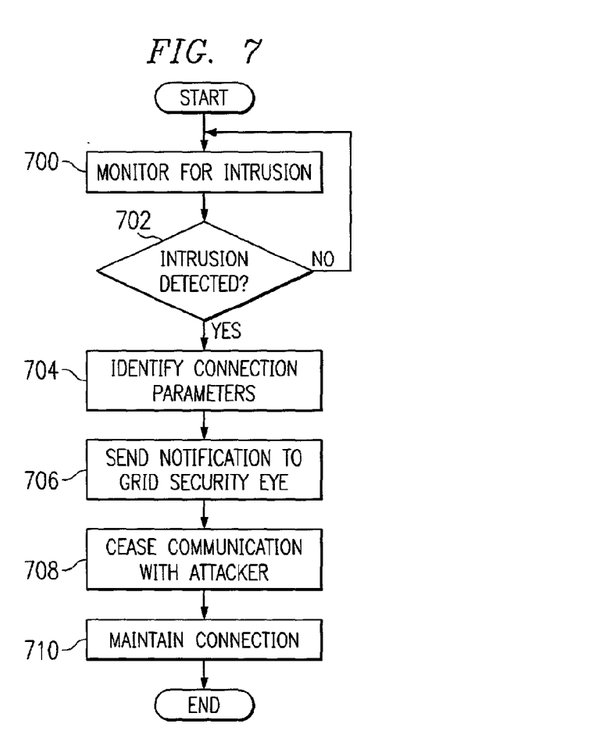
FIG. 7 is a flowchart of a process used for handling detection of an intrusion in accordance with a preferred embodiment of the present invention.

With reference now to FIG. 7, a flowchart of a process used for handling detection of an intrusion is depicted in accordance with a preferred embodiment of the present invention. The process illustrated in FIG. 7 may be implemented in a node, such as node 406 in FIG. 4.

The process begins by monitoring for an intrusion (step 700). The monitoring for intrusions may be implemented using various known mechanisms for detecting unauthorized access. For example, promiscuous network monitoring may be employed in which the node sees all network traffic. Examples are Iptrace in AIX and snoop with Solaris.

A determination is made as to whether an intrusion has been detected (step 702). If an intrusion has been detected, connection parameters are identified (step 704). Examples of connection parameters are illustrated in connection parameters 500 in FIG. 5. Of course, the particular types of parameters will depend on the type of connection used in the attack. Notification is sent to the grid security eye (step 706) and communication with the attacker ceases (step 708). The connection is maintained (step 710) and the process terminates thereafter. The connection is maintained to avoid alerting the attacker to the fact that the intrusion has been detected.

Referring again to step 702, if an intrusion is not detected, the process returns to step 700 as described above.

Figures 8, 9:
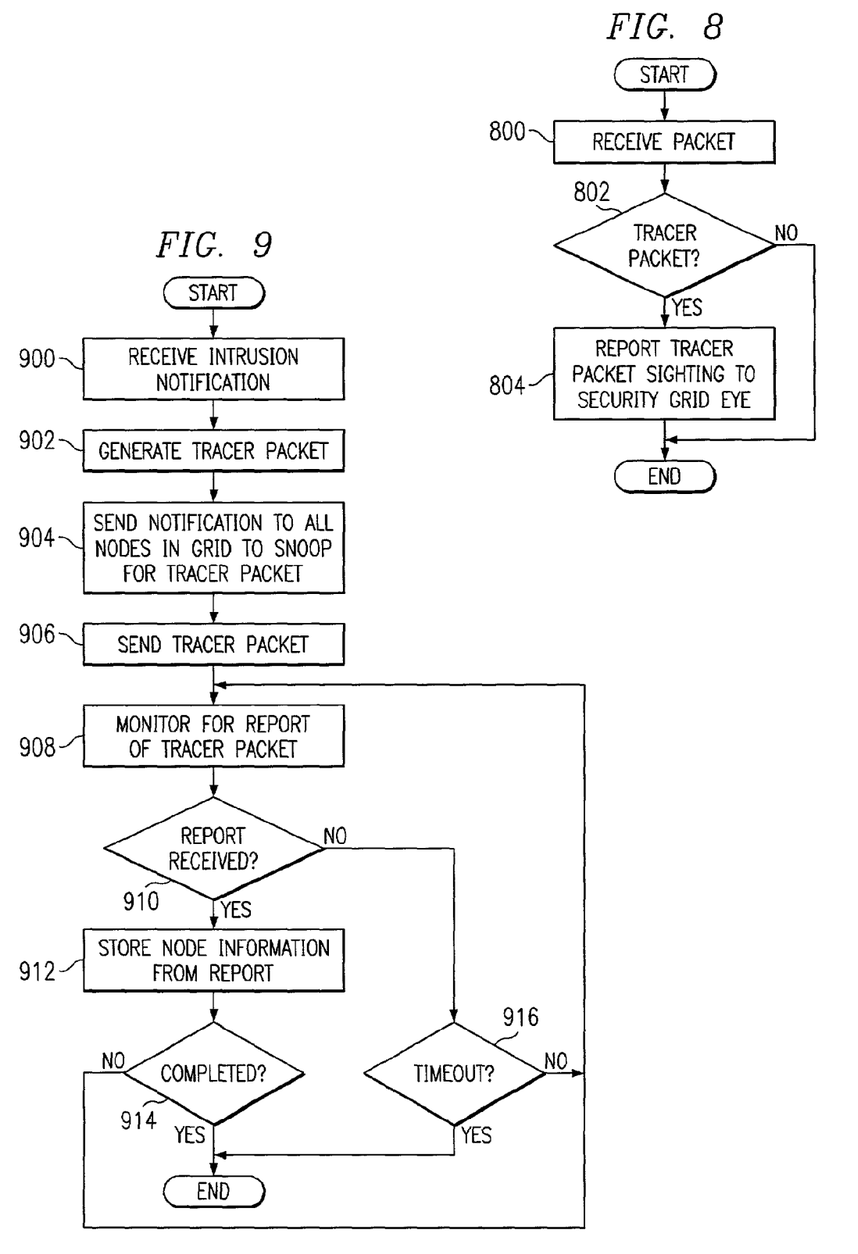
FIG. 8 is a flowchart of a process used for monitoring for tracer packets in accordance with a preferred embodiment of the present invention.
FIG. 9 is a flowchart of a process used for handling a report of an intrusion in accordance with a preferred embodiment of the present invention.

Turning now to FIG. 8, a flowchart of a process used for monitoring for tracer packets is depicted in accordance with a preferred embodiment of the present invention. The process illustrated in FIG. 8 may be implemented in a node, such as node 402 or 412 in FIG. 4. Specifically, this process may be implemented in any node within a network.

The process begins by receiving a packet (step 800). A determination is made as to whether the packet is a tracer packet (step 802). This determination may be made by comparing information in the packet with information received from the grid security eye. For example, this information may be an identifier containing a digital signature. If the packet is a tracker packet, the tracker packet sighting is reported to the security grid eye (step 804) and the process terminates thereafter. This report may include, for example, the identification of the node and a time stamp identifying when a packet was received.

Referring again to step 802, if the packet is not a tracer packet, the process terminates.

With reference now to FIG. 9, a flowchart of a process used for handling a report of an intrusion is depicted in accordance with a preferred embodiment of the present invention. The process illustrated in FIG. 9 may be implemented in a command node or grid security eye, such as node 400 in FIG. 4.

The process begins by receiving an intrusion notification (step 900). In these examples, the intrusion notification also includes connection parameters, such as connection parameters 500 in FIG. 5. A tracer packet is generated (step 902). Notification is sent to all nodes in the grid to snoop for the tracer packet (step 904). This notification allows for all of the nodes in a network to monitor for the tracer packet. For example, an identifier, such as a digital signature or other unique identification information in the payload or elsewhere in the packet may be sent to all of the nodes within the network for use in monitoring for the tracer packet. The tracer packet is sent to the node identified in the connection parameters as the source (step 906). Monitoring for a report of the tracer packet is initiated (step 908).

Next, a determination is made as to whether a report has been received (step 910). If a report has been received, the node information from the report is stored (step 912). A determination is made as to whether monitoring is completed (step 914). Monitoring may finish or complete if the source or the entry point of the attack is identified. If monitoring is completed, the process terminates. Otherwise, the process returns to step 908 as described above.

Referring again to step 910, if a report has not been received, a determination is made as to whether a timeout has occurred (step 916). If a timeout has occurred, the process terminates. If a timeout has not occurred, the process returns to step 908 as described above. The reports may be used to generate or identify a route through which the hacker has used to attack the victim. With this information, the location of the hacker or an entry point may be identified with appropriate security measures being taken based on the identification.

Thus, the present invention provides an improved method, apparatus, and computer instructions for identifying a source of an intrusion. Specifically, the actual location of the hacker or an entry point into the network may be identified using the mechanism of the present invention. A tracer packet and a monitoring process are used to detect a path within the network along which intrusions have occurred. In this manner, attacks on a network, such as a grid, may be quickly identified and handled.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. In these examples, the processes of the present invention were described as implemented in a grid. The mechanism of the present invention may be applied to other types of networks including, for example, a LAN or a WAN. Further, the mechanism of the present invention may be applied to any type of connection or protocol used in an intrusion. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system for handling intrusions, the method comprising:

responsive to receiving notification at a central command node of an intrusion from a victim node in a network data processing system, sending a tracer packet from the central command node back to an intruder causing the intrusion, wherein the tracer packet comprises a source internet protocol address of the victim node so that the tracer packet appears to originate from the victim node, and wherein the tracer packet further comprises a destination internet protocol address of a node adjacent to the victim node;

notifying nodes in the network data processing system of the tracer packet; and responsive to receiving a message from a node indicating receipt of the tracer packet, storing identification of the node for use in tracing a route of the tracer packet through the data processing system.

2. The method of claim 1 further comprising:

determining whether the intruder is a node within the network data processing system using the route; and responsive to the intruder being a node within the network data processing system, revoking access by the intruder to other nodes within the network data processing system.

3. The method of claim 2 further comprising:

responsive to the intruder being a node outside of the network data processing system, identifying an entry node serving as an entry point into the network data processing system; and preventing access to the entry node.

4. The method of claim 1, wherein the network data processing system is a grid.

5. A method in a data processing system for handling an intrusion, wherein the data processing system is located within a network data processing system, the method comprising:

detecting an intrusion by an attacking node, wherein a connection is established with the attacking node;

responsive to detecting the intrusion, sending a notification of the intrusion to a security node in the network data processing system, wherein responsive to receiving the notification of the intrusion, the security node sends a tracer packet from the central command node back to an intruder causing the intrusion, wherein the tracer packet comprises a source internet protocol address of the victim node so that the tracer packet appears to originate from a victim node, and wherein the tracer packet further comprises a destination internet protocol address of a node adjacent to the victim node;

ceasing communication with the attacking node; and maintaining the connection with the attacking node.

6. The method of claim 5, wherein the network data processing system is a grid.

7. The method of claim 5, wherein the attacking node is a node within the network data processing system.

8. The method of claim 5, wherein the attacking node is a node outside of the network data processing system.

9. A network data processing system comprising:
a network;
a security node connected to the network; and
a plurality of nodes connected to the network, wherein a victim node within the plurality of nodes sends an intrusion alert to the security node in response to detecting an attack in which the intrusion alert includes information about the intrusion, the security node sends a tracer packet onto the network and notifies the plurality of nodes of the tracer pack when an intrusion alert is received, wherein the tracer packet comprises a source internet protocol address of the victim node so that the tracer packet appears to originate from a victim node, and wherein the tracer packet further comprises a destination internet protocol address of a node adjacent to the victim node, each of the plurality of nodes looks for the tracer packet and sends a message to the security node when the tracer packet in which the message indicates reception of the tracer node, and the security node stores information about nodes within the plurality of nodes receiving the tracer packet for use in identifying a route of the tracer packet in the network data processing system.

10. A data processing system for handling intrusions, the data processing system comprising:
a bus system;
a communications unit connected to the bus system;
a memory connected to the bus system, wherein the memory includes a set of instructions; and
a processing unit connected to the bus system, wherein the processing unit executes the set of instructions to send a tracer packet back to an intruder causing the intrusion in response to receiving notification of an intrusion from a particular node in a network data processing system, wherein the tracer packet comprises a source internet protocol address of the victim node so that the tracer packet appears to originate from a victim node, and wherein the tracer packet further comprises a destination internet protocol address of a node adjacent to the victim node; notify nodes in the network data processing system of the tracer packet; and store identification of the node for use in tracing a route of the tracer packet through the data processing system in response to receiving a message from a node indicating receipt of the tracer packet.

11. A data processing system for handling an intrusion, the data processing system comprising:
a bus system;
a communications unit connected to the bus system;
a memory connected to the bus system, wherein the memory includes a set of instructions; and
a processing unit connected to the bus system, wherein the processing unit executes the set of instructions to detect an intrusion by an attacking node in which a connection is established with the attacking node; send a notification of the intrusion to a security node in the network data processing system in response to detecting the intrusion, wherein responsive to receiving the notification of the intrusion, the security node sends a tracer packet from the central command node back to an intruder causing the intrusion, wherein the tracer packet comprises a source internet protocol address of the victim node so that the tracer packet appears to originate from a victim node, and wherein the tracer packet further comprises a destination internet protocol address of a node adjacent to the victim node; cease communication with the attacking node; and maintain the connection with the attacking node.

12. A data processing system for handling intrusions, the data processing system comprising:
sending means, responsive to receiving notification at a central command node of an intrusion from a victim node in a network data processing system, sending a tracer packet from the central command node back to an intruder causing the intrusion, wherein the tracer packet comprises a source internet protocol address of the victim node so that the tracer packet appears to originate from the victim node, and wherein the tracer packet further comprises a destination internet protocol address of a node adjacent to the victim node;
notifying means for notifying nodes in the network data processing system of the tracer packet; and
storing means, responsive to receiving a message from a node indicating receipt of the tracer packet, for storing identification of the node for use in tracing a route of the tracer packet through the data processing system.

13. The data processing system of claim 12 further comprising:
determining means for determining whether the intruder is a node within the network data processing system using the route; and
revoking means, responsive to the intruder being a node within the network data processing system, for revoking access by the intruder to other nodes within the network data processing system.

14. The data processing system of claim 13 further comprising:
identifying means, responsive to the intruder being a node outside of the network data processing system, for identifying an entry node serving as an entry point into the network data processing system; and
preventing means for preventing access to the entry node.

15. A data processing system for handling an intrusion, wherein the data processing system is located within a network data processing system, the data processing system comprising:
detecting means for detecting an intrusion by an attacking node, wherein a connection is established with the attacking node;
sending means, responsive to detecting the intrusion, for sending a notification of the intrusion to a security node in the network data processing system, wherein responsive to receiving the notification of the intrusion, the security node sends a tracer packet from the central command node back to an intruder causing the intrusion, wherein the tracer packet comprises a source internet protocol address of the victim node so that the tracer packet appears to originate from a victim node, and wherein the tracer packet further comprises a destination internet protocol address of a node adjacent to the victim node;
ceasing means for ceasing communication with the attacking node; and maintaining means for maintaining the connection with the attacking node.

16. The data processing system of claim 15, wherein the attacking node is a node within the network data processing system.

17. The data processing system of claim 15, wherein the attacking node is a node outside of the network data processing system.

18. A computer program product in a computer readable storage medium for handling intrusions, the computer program product comprising:
 first instructions, stored in the computer readable storage medium, responsive to receiving notification at a central command node of an intrusion from a victim node in a network data processing system, for sending a tracer packet from the central command node back to an intruder causing the intrusion, wherein the tracer packet comprises a source internet protocol address of the victim node so that the tracer packet appears to originate from the victim node, and wherein the tracer packet further comprises a destination internet protocol address of a node adjacent to the victim node;
 second instructions, stored in the computer readable storage medium, for notifying nodes in the network data processing system of the tracer packet; and
 third instructions, stored in the computer readable storage medium, responsive to receiving a message from a node indicating receipt of the tracer packet, for storing identification of the node for use in tracing a route of the tracer packet through the data processing system.

19. A computer program product in a computer readable storage medium for handling an intrusion in a data processing system located within a network data processing system, the computer program product comprising:
 first instructions, stored in the computer readable storage medium, for detecting an intrusion by an attacking node, wherein a connection is established with the attacking node;
 second instructions, stored in the computer readable storage medium, responsive to detecting the intrusion, for sending a notification of the intrusion to a security node in the network data processing system, wherein responsive to receiving the notification of the intrusion, the security node sends a tracer packet from the central command node back to an intruder causing the intrusion, wherein the tracer packet comprises a source internet protocol address of the victim node so that the tracer packet appears to originate from a victim node, and wherein the tracer packet further comprises a destination internet protocol address of a node adjacent to the victim node;
 third instructions, stored in the computer readable storage medium, for ceasing communication with the attacking node; and
 fourth instructions, stored in the computer readable storage medium, for maintaining the connection with the attacking node.

\* \* \* \* \*